US009902003B2

(12) United States Patent
Takahashi

(10) Patent No.: US 9,902,003 B2
(45) Date of Patent: Feb. 27, 2018

(54) MACHINING DEVICE AND MACHINING METHOD

(71) Applicants: CITIZEN WATCH CO., LTD., Tokyo (JP); CITIZEN MACHINERY CO., LTD., Nagano (JP)

(72) Inventor: Hikaru Takahashi, Nagano (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 0 days.

(21) Appl. No.: 15/116,125

(22) PCT Filed: Jan. 29, 2015

(86) PCT No.: PCT/JP2015/052563
§ 371 (c)(1),
(2) Date: Aug. 2, 2016

(87) PCT Pub. No.: WO2015/115562
PCT Pub. Date: Aug. 6, 2015

(65) Prior Publication Data
US 2017/0182572 A1 Jun. 29, 2017

(30) Foreign Application Priority Data
Feb. 3, 2014 (JP) ................................. 2014-018882

(51) Int. Cl.
*B23F 5/26* (2006.01)
*B23F 21/12* (2006.01)
(Continued)

(52) U.S. Cl.
CPC ................ *B23F 5/20* (2013.01); *B23C 3/30* (2013.01); *B23C 5/10* (2013.01); *B23F 5/202* (2013.01);
(Continued)

(58) Field of Classification Search
CPC . Y10T 409/102385; Y10T 409/103021; Y10T 409/103339; Y10T 409/103498;
(Continued)

(56) References Cited

U.S. PATENT DOCUMENTS 1,545,070 A * 7/1925 Sears ...................... B23F 5/205
409/41
1,763,983 A * 6/1930 Olson ...................... B23F 5/22
407/26

(Continued)

FOREIGN PATENT DOCUMENTS

JP S60-501052 A 7/1985
JP S63-002609 A 1/1988
(Continued)

OTHER PUBLICATIONS

International Search Report for PCT/JP2015/052563, dated Mar. 31, 2015.

(Continued)

*Primary Examiner* — Erica E Cadugan

(57) ABSTRACT

The present invention achieves a machining apparatus which can easily be composed and a machining method which can perform gear machining or splined shaft machining easily by using an existing lathe. More specifically, the invention achieves a machining apparatus 1 comprising: a cutter 11 which includes a blade part 20 formed in the shape of a ring around a peripheral surface thereof and which is driven to rotate about an axis thereof; a workpiece holder 13 which holds a workpiece W rotatably; and a cutter driver 12 which moves the cutter 11 and the workpiece W relative to each other along an axial direction, wherein a gear or a splined shaft is formed on the peripheral surface of the workpiece W by synchronizing the rotation of the workpiece W with the relative movement of the cutter 11 and the workpiece W and by rotating the cutter 11, and wherein a plurality of the blade (Continued)

parts 20 are disposed side by side along the axis, the cutter driver 12 drives the cutter 11 to rotate in one direction around the axis and to reciprocate relative to the workpiece W along the axis, the workpiece holder 13 rotates the workpiece W in a forward/reverse direction in accordance with reciprocation of the cutter 11, and cutting is performed on the workpiece W so as to form thereon an external shape of a gear or a splined shaft by placing each of the blade parts 20 of the cutter 11 in contact with the peripheral surface of the workpiece W.

10 Claims, 9 Drawing Sheets

(51) Int. Cl.
*B23F 5/20* (2006.01)
*B23C 3/30* (2006.01)
*B23C 5/10* (2006.01)
*B23F 5/22* (2006.01)

(52) U.S. Cl.
CPC ............... *B23F 5/205* (2013.01); *B23F 5/22* (2013.01); *B23F 21/12* (2013.01); *B23F 21/122* (2013.01); *B23C 2210/244* (2013.01); *B23C 2220/36* (2013.01); *Y10T 29/5109* (2015.01); *Y10T 407/17* (2015.01); *Y10T 407/1745* (2015.01); *Y10T 409/10795* (2015.01); *Y10T 409/101749* (2015.01); *Y10T 409/105565* (2015.01); *Y10T 409/108586* (2015.01); *Y10T 409/108904* (2015.01)

(58) Field of Classification Search
CPC . Y10T 409/103657; Y10T 409/105565; Y10T 409/106201; Y10T 409/10636; Y10T 409/107155; Y10T 409/108586; Y10T 409/108745; Y10T 409/108904; Y10T 409/10–409/109699; Y10T 407/17; Y10T 407/1715–407/173; Y10T 407/174–407/1745; B23F 5/205; B23F 5/202; B23F 5/22; B23F 1/06–1/065; B23F 5/20–5/27; B23F 21/12; B23F 21/122; B23F 21/126; B23F 21/128; B23F 21/14–21/186

USPC .................. 409/1–62; 407/20, 23–26, 28–29
See application file for complete search history.

(56) References Cited

U.S. PATENT DOCUMENTS

| | | | |
|---|---|---|---|
| 2,112,455 A * | 3/1938 | Edgar | B23F 5/22 407/23 |
| 2,736,239 A * | 2/1956 | Higashi et al. | B23F 15/00 409/41 |
| 4,565,474 A | 1/1986 | Charles | |
| 4,750,848 A | 6/1988 | Adler | |
| 2011/0027031 A1* | 2/2011 | Zeller | B23F 1/00 409/50 |
| 2013/0051948 A1* | 2/2013 | Masuo | B23F 5/04 409/38 |
| 2013/0322974 A1 | 12/2013 | Scherbarth | |
| 2016/0325366 A1* | 11/2016 | Ellicott | B23F 5/202 |

FOREIGN PATENT DOCUMENTS

| | | |
|---|---|---|
| JP | S63-068315 A | 3/1988 |
| JP | 2013-158883 A | 8/2013 |
| JP | 2013-543450 A | 12/2013 |
| WO | 2007/051222 A1 | 5/2007 |
| WO | WO-2011/129008 A1 * | 10/2011 |

OTHER PUBLICATIONS

Written opinion of the International Searching Authority for PCT/JP2015/052563, dated Mar. 31, 2015.
State Intellectual Property Office of the People's Republic of China, Office Action for Chinese patent application No. 201580007105.2, dated Jul. 25, 2017.
European Patent Office, Extended European Search Report for EP patent application No. 15743949.8, Oct. 16, 2017.
Jablonwski J: "Generating Gears Via Software, New Concept Has the CNC Directing All Motions of the Machine, Allowing Milling Cutters to Generate Any Gear Geometry", American Machi, Jul. 1, 1983, pp. 85-88, New York, NY, US, XP009071490.

* cited by examiner

MACHINING DEVICE AND MACHINING METHOD

TECHNICAL FIELD

The present invention relates to a machining apparatus and machining method for forming a gear or a shaft having a gear-shaped cross-section.

BACKGROUND ART

In the prior art, it is known to provide a method for generating a gear on a workpiece and a gear machining apparatus comprising a cutter which includes a cutting blade formed in the shape of a ring around a peripheral surface thereof and which is driven to rotate about an axis thereof, a workpiece holder which holds a workpiece in a rotatably driven manner, and a mover which moves the cutter and the workpiece relative to each other along the axial direction of the cutter, wherein a gear is formed on the peripheral surface of the workpiece by synchronizing the rotation of the workpiece with the relative movement of the cutter and the workpiece and by pressing the cutter onto the workpiece while rotating the cutter (for example, refer to patent document 1).

PRIOR ART DOCUMENT

Patent Document

Patent document 1: Japanese Unexamined Patent Publication No. S63-2609

SUMMARY OF THE INVENTION

In the gear generation method and gear machining apparatus as disclosed in patent document 1 (Japanese Unexamined Patent Publication No. S63-2609), the gear has had to be generated by successively moving the rotating cutter while rotating the workpiece in one direction, and therefore, it is not easy to perform gear machining efficiently.

In view of the above problem, it is an object of the present invention to provide a gear machining apparatus which can easily be composed and a gear machining method which can perform gear machining easily by using an existing lathe.

To achieve the above object, there is provided a machining apparatus comprising: a cutter which includes a blade part formed in the shape of a ring around a peripheral surface thereof and which is driven to rotate about an axis thereof; a workpiece holder which holds a workpiece rotatably; and a cutter driver which moves the cutter and the workpiece relative to each other along an axial direction of the cutter, wherein an external shape of a gear or a shaft having a gear-shaped cross-section is formed on the peripheral surface of the workpiece by synchronizing the rotation of the workpiece with the relative movement of the cutter and the workpiece and by pressing the cutter onto the workpiece while rotating the cutter, a plurality of the blade parts are disposed side by side along the axis, the cutter driver drives the cutter to rotate in one direction around the axis and to reciprocate relative to the workpiece along the axis, the workpiece holder rotates the workpiece in a forward or reverse direction in accordance with the reciprocation of the cutter, and cutting is performed on the workpiece so as to form thereon an external shape of a gear or a shaft having a gear-shaped cross-section by placing each of the blade parts of the cutter in contact with the peripheral surface of the workpiece.

In the machining apparatus, the shaft having a gear-shaped cross-section is composed of a splined shaft or a serrated shaft.

The machining apparatus further comprises a controller which controls the reciprocation of the cutter by the cutter driver and the forward or reverse rotation by the workpiece holder in such a manner that a direction and speed of reciprocation of the cutter and a direction and speed of rotation of the workpiece are synchronized with each other at a face where the cutter contacts the workpiece.

The blade part may be composed of a plurality of cutting blades disposed at prescribed spaced intervals around the peripheral surface.

Alternatively, the blade part may be composed of a cutting blade formed continuously so as to go around the axis.

There is also provided a machining method comprising steps of rotating a cutter having a plurality of blade parts disposed side by side along an axis thereof, in one direction around the axis, each blade part being formed in the shape of a ring around a peripheral surface thereof, as well as reciprocating the cutter relative to a workpiece along the axis; rotating the workpiece in a forward or reverse direction in accordance with reciprocation of the cutter; cutting the workpiece so as to form thereon an external shape of a gear or a shaft having a gear-shaped cross-section by placing each of the blade parts of the cutter in contact with the peripheral surface of the workpiece.

In the machining method, the shaft having a gear-shaped cross-section is composed of a splined shaft or a serrated shaft.

In the machining method, the step of rotating the workpiece includes a step of rotating the workpiece in a forward or reverse direction in accordance with the reciprocation of the cutter in such a manner that a direction and speed of reciprocation of the cutter and a direction and speed of rotation of the workpiece are synchronized with each other at a face where the cutter contacts the workpiece.

The blade part may be composed of a plurality of cutting blades disposed at prescribed spaced intervals around the peripheral surface.

Alternatively, the blade part may be composed of a cutting blade formed continuously so as to go around the axis.

According to the present invention, by continuously reciprocating the cutter and the workpiece relative to each other, and continuously rotating the workpiece in a forward or reverse direction in synchronism with the reciprocation, a gear or a shaft having a gear-shaped cross-section can be generated easily and continuously, and thus the machining of the gear, splined shaft, serrated shaft, etc., can be performed efficiently. Further, since the cutter can be composed by disposing a plurality of blade parts side by side along the axis, each blade part being formed in the shape of a ring around the axis, and since there is no need to form cutting blades along a helix as in a well-known hob as a gear cutting tool, the cutter can easily be composed.

Furthermore, since there is no need to tilt the cutter relative to the workpiece in accordance with the inclined angle of the helix of the cutting blade as in the above hob, a gear or a shaft having a gear-shaped cross-section can be easily generated using a general lathe.

In this way, according to the present invention, a machining apparatus and a machining method which can perform the machining of a gear or a shaft having a gear-shaped cross-section easily by using an existing lathe can be achieved.

MODE FOR CARRYING OUT THE INVENTION

Figure 1:
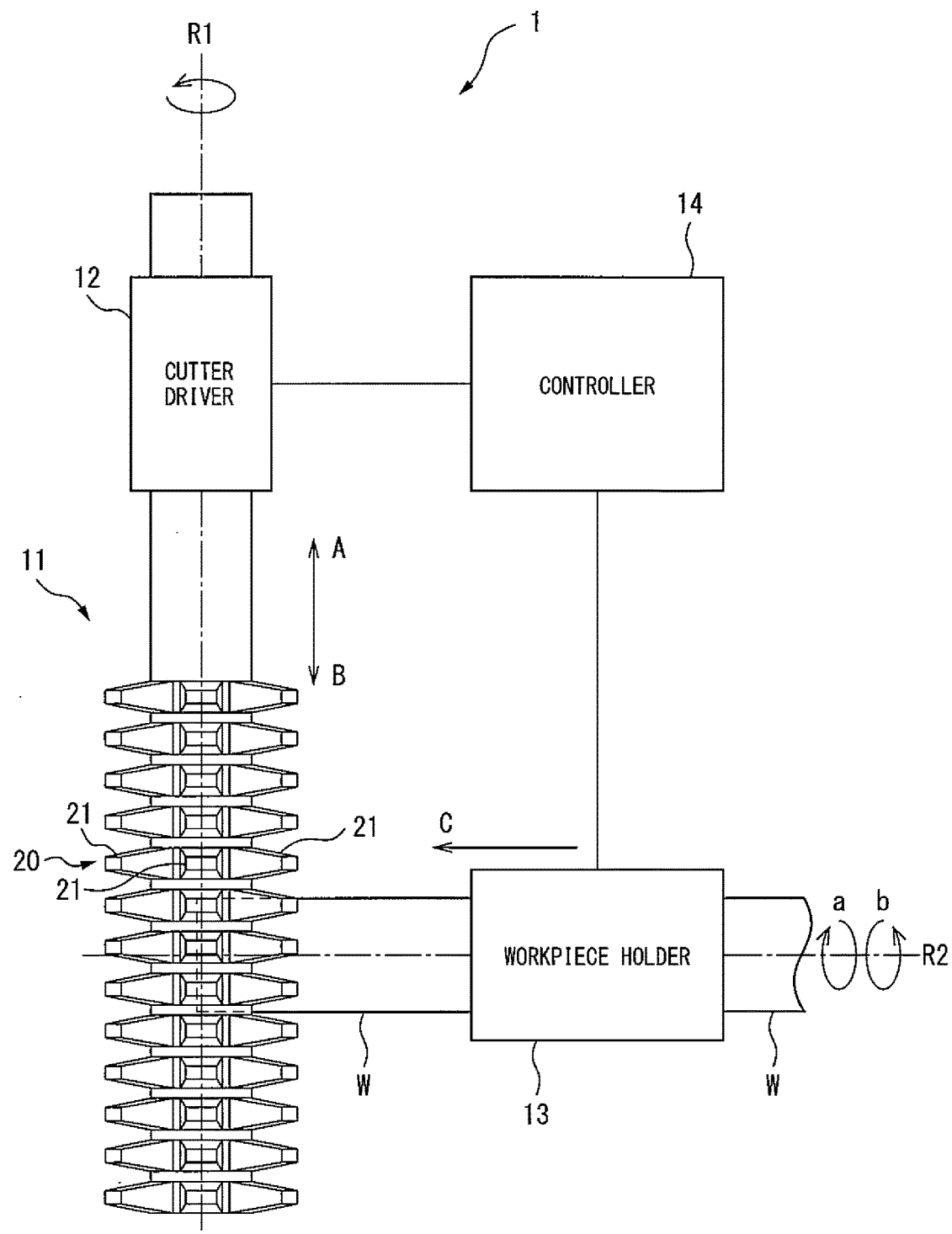
FIG. 1 is a schematic diagram showing a gear machining apparatus according to an embodiment of the present invention.
Figure 2:
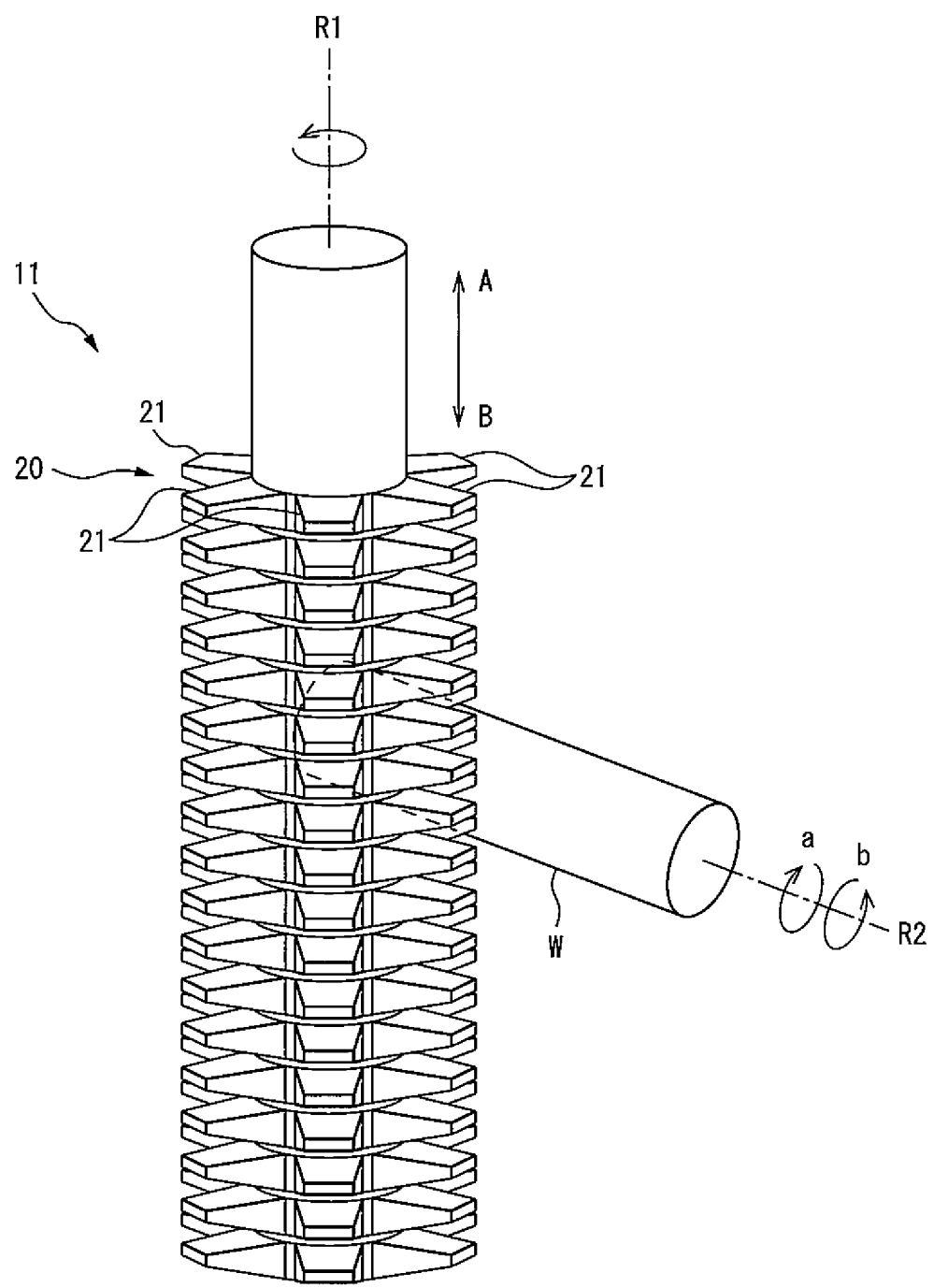
FIG. 2 is a perspective view showing a portion of the gear machining apparatus according to the embodiment of the present invention.
Figure 3:
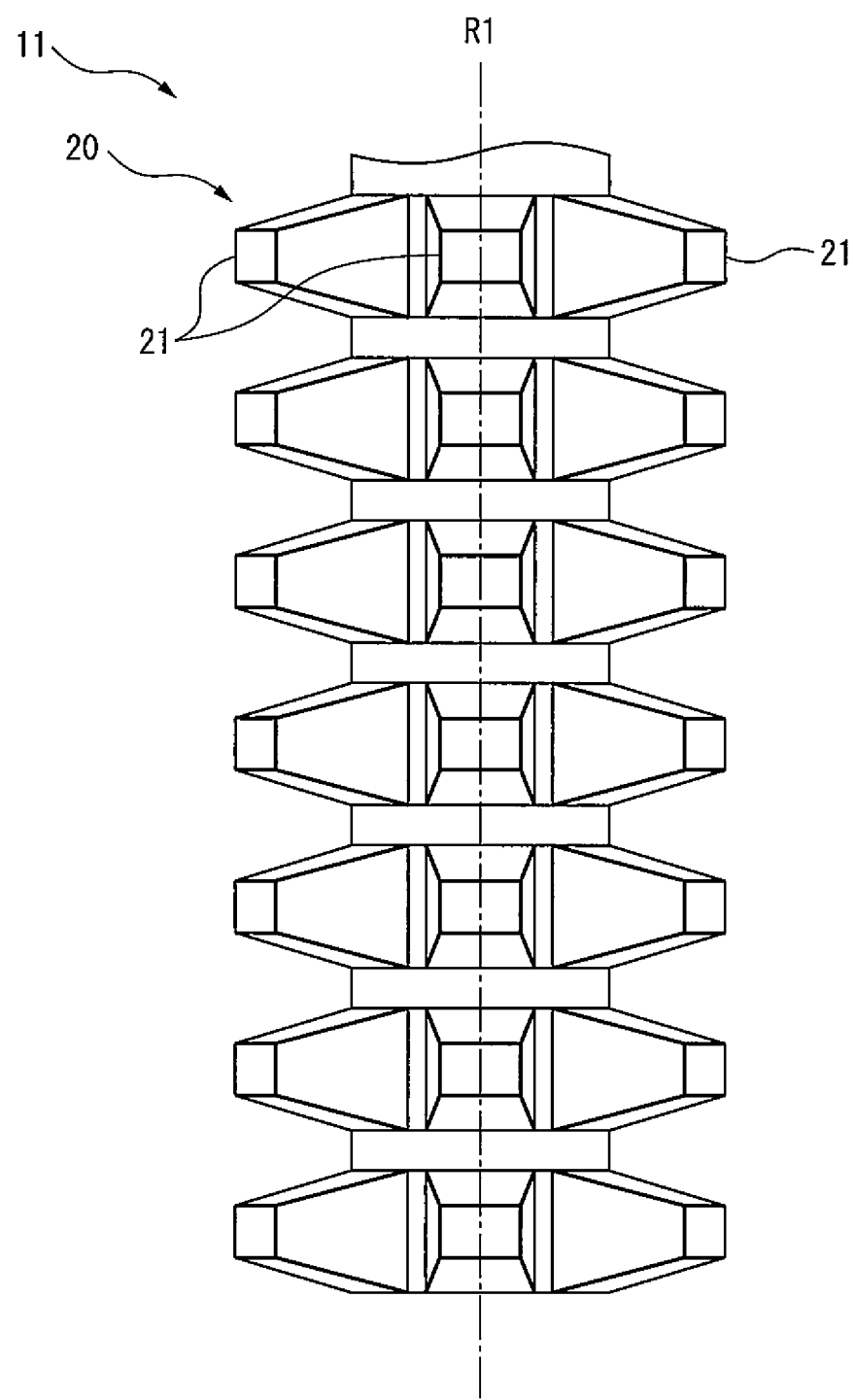
FIG. 3 is an enlarged view of a cutter in the gear machining apparatus according to the embodiment of the present invention.

FIG. 1 is a schematic diagram showing a gear machining apparatus according to an embodiment of the present invention. It is to be understood that, throughout the different drawings given herein, a component element with the same reference numeral designates the component element having the same function. FIG. 2 is a perspective view showing a portion of the gear machining apparatus according to the embodiment of the present invention. FIG. 3 is an enlarged view of a cutter in the gear machining apparatus according to the embodiment of the present invention.

The gear machining apparatus 1 includes a cutter 11, a cutter driver 12, a workpiece holder 13, and a controller 14. The cutter driver 12 and the workpiece holder 13 are controlled by the controller 14.

A plurality of cutting blades 21 are disposed, being spaced at a prescribed distance from each other around the axis R1 of the cutter 11, on the peripheral surface of the cutter 11. The plurality of cutting blades 21 together constitute one set of cutting blades 21, and one set of cutting blades 21 forms one ring-shaped blade part 20 around the peripheral surface of the cutter 11. A plurality of blade parts 20 is disposed side by side along the axis R1.

The cutter driver 12, which includes, for example, a cutter holder of a lathe, drives the cutter 11 to rotate about the axis R1 and to reciprocate along the axis R1 in accordance with control of the controller 14. The rotational speed of the cutter 11 is set fast enough for the blade parts 20 of the cutter 11 to cut the workpiece W.

The workpiece holder 13, which includes, for example, a spindle of a lathe, holds the workpiece W so that the axis R1 of the cutter 11 and the axis R2 of the workpiece W cross each other, and drives the workpiece W to rotate in the forward or reverse direction about the axis R2 in synchronism with the reciprocation of the cutter 11 in accordance with control of the controller 14. In the present embodiment, the workpiece W is held so that the axis R1 and the axis R2 cross each other at right angles.

In the present embodiment, the cutter driver 12 and the workpiece holder 13 are controlled by the controller 14 such that, when the cutter 11 moves in direction A, the workpiece W rotates in direction a (for convenience, referred to as the "forward direction" in this specification) and, when the cutter 11 moves in direction B, the workpiece W rotates in direction b (for convenience, referred to as the "reverse direction" in this specification).

Figure 4:
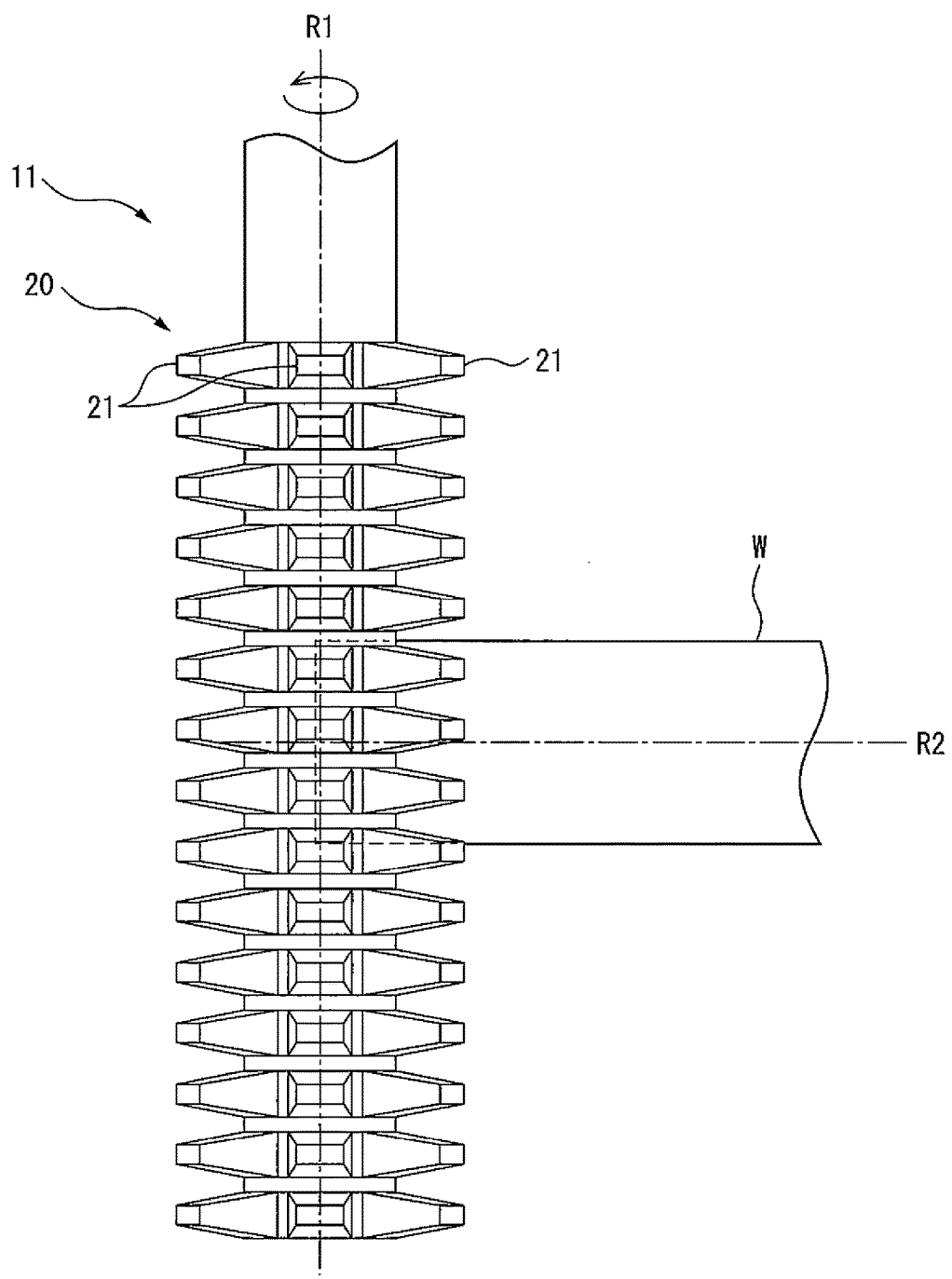
FIG. 4 is a perspective view for explaining the positional relationship between the cutter and workpiece in the gear machining apparatus according to the embodiment of the present invention.

FIG. 4 is a perspective view for explaining the positional relationship between the cutter and the workpiece in the gear machining apparatus according to the embodiment of the present invention. A description will be given below by taking as an example the case in which the cutter 11 is located closer to the viewer of FIG. 4 than the workpiece W is, and, in terms of the external shape of the gear, a gear is formed whose tooth profile is an involute curve.

Figure 5:
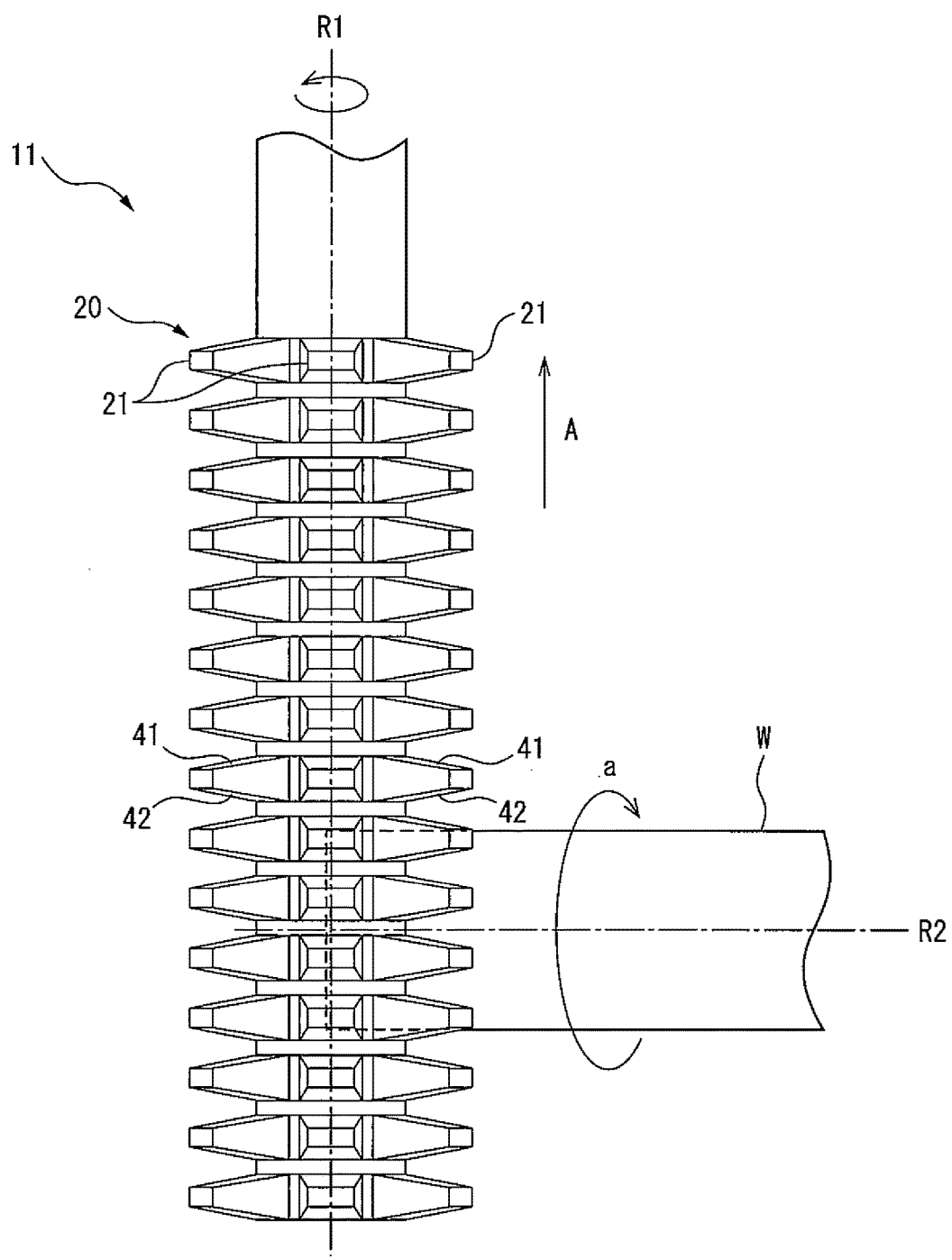
FIG. 5 is a front view showing the rotational direction of the workpiece when the direction of reciprocation of the cutter is direction A.
Figure 6:
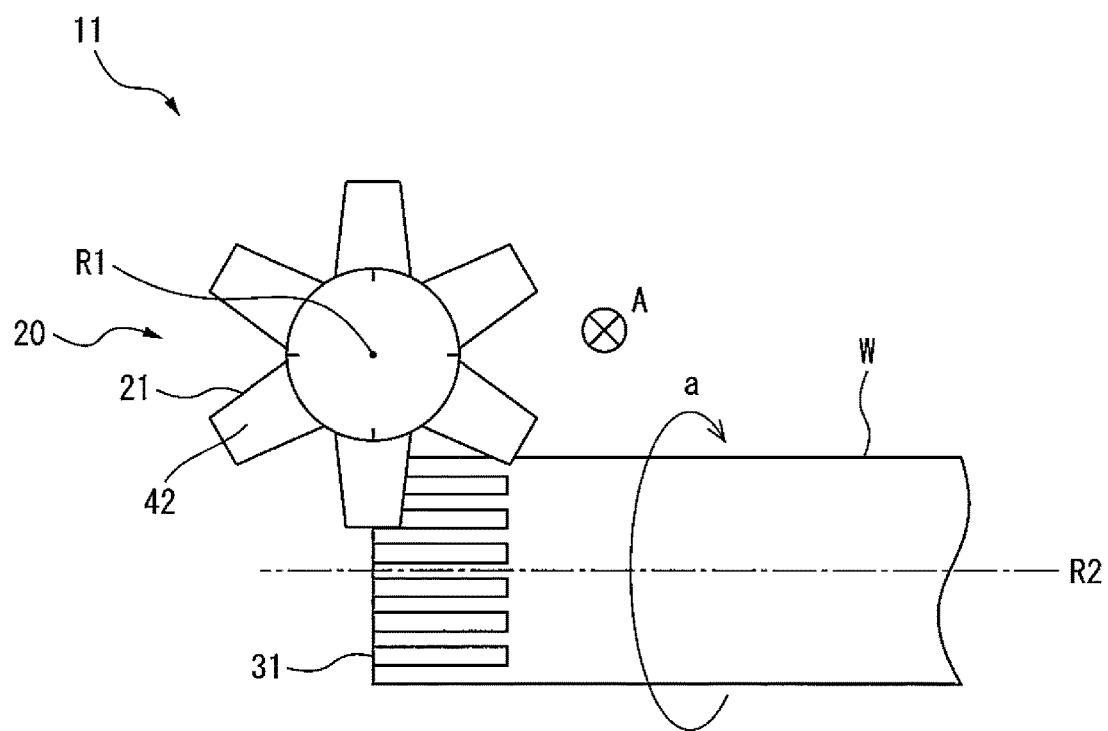
FIG. 6 is a bottom view showing the rotational direction of the workpiece when the direction of reciprocation of the cutter is direction A.

FIGS. 5 and 6 are diagrams showing the rotational direction of the workpiece when the direction of reciprocation of the cutter is direction A; FIG. 5 shows a front view and FIG. 6 a bottom view. The controller 14, by controlling the cutter driver 12 and the workpiece holder 13, rotates the cutter 11 in one direction and moves the cutter 11 in direction A, and rotates the workpiece W in the forward direction, synchronizing the movement speed of the cutter 11 to the rotating speed of the workpiece W so as to form an involute curve of the gear. In this way, each blade part 20 is sequentially brought into contact with the peripheral surface of the workpiece W, so that the workpiece W can be continuously cut on the side of one face of each cutting blade 21 (the face 41 of the cutting blade 21 facing in direction A of movement of the cutter 11 in FIGS. 5 and 6).

Figure 7:
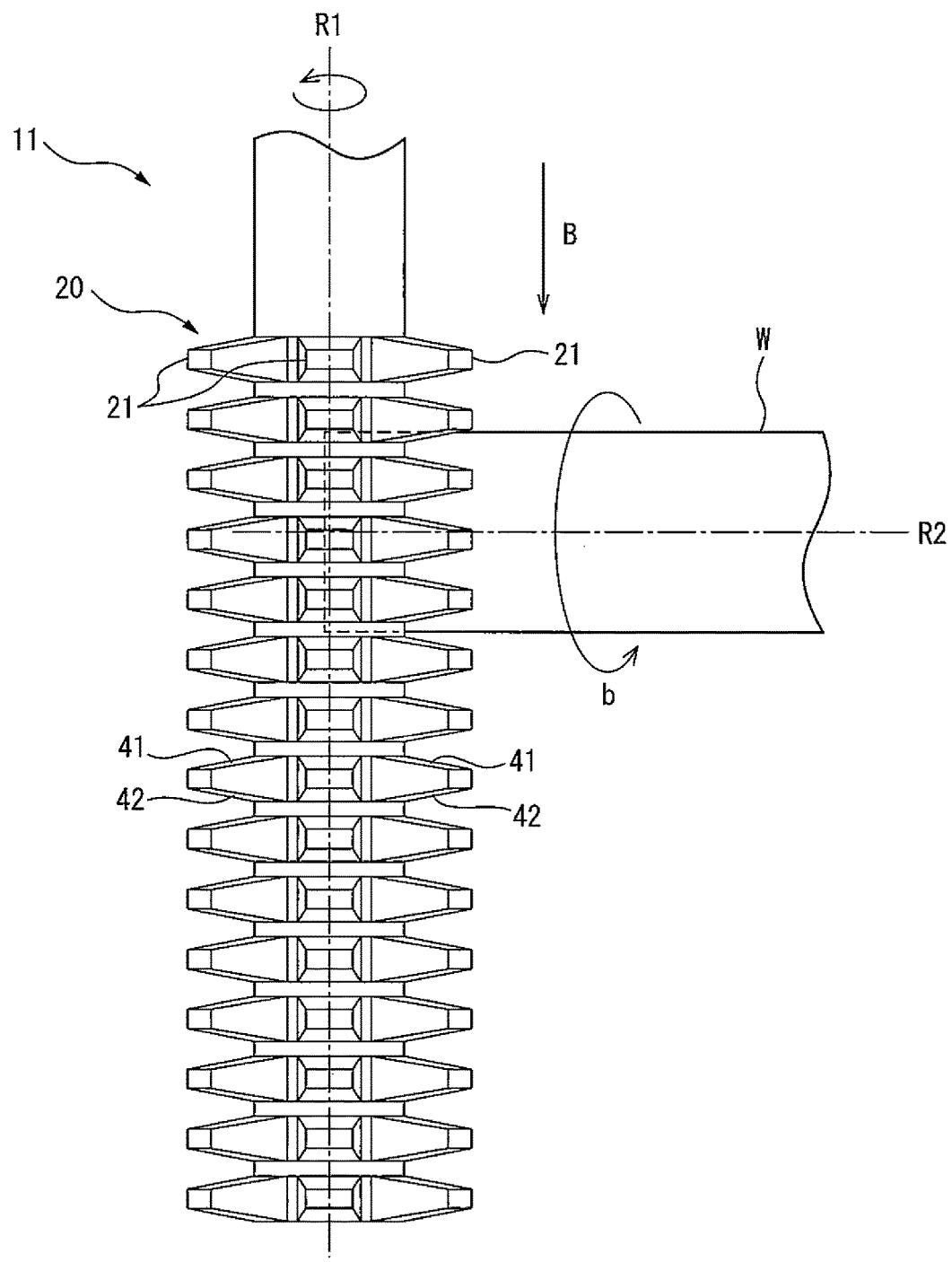
FIG. 7 is a front view showing the rotational direction of the workpiece when the direction of reciprocation of the cutter is direction B.
Figure 8:
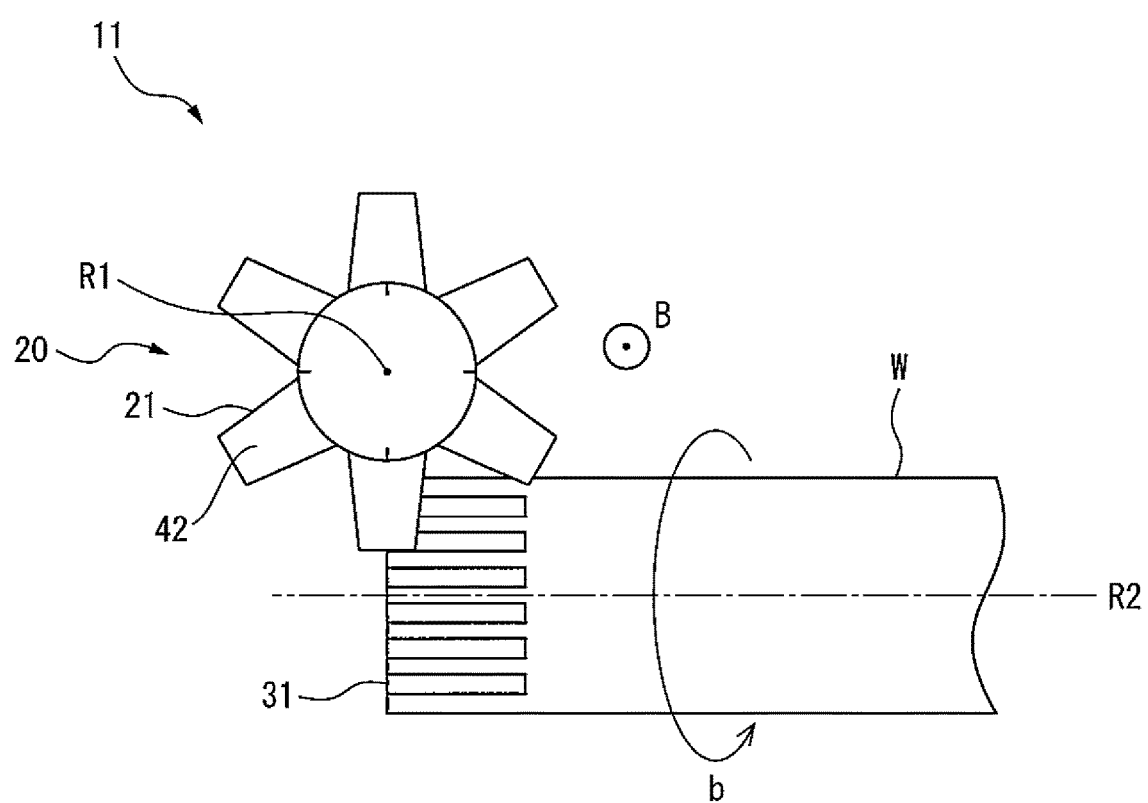
FIG. 8 is a bottom view showing the rotational direction of the workpiece when the direction of reciprocation of the cutter is direction B.

FIGS. 7 and 8 are diagrams showing the rotational direction of the workpiece when the direction of reciprocation of the cutter is direction B along the rotational axis R1; FIG. 7 shows a front view and FIG. 8 a bottom view. Conversely to the above case in which the cutter 11 moves in direction A and the workpiece W rotates in the forward direction, the controller 14, by controlling the cutter driver 12 and the workpiece holder 13, rotates the cutter 11 in one direction and moves the cutter 11 in direction B, and rotates the workpiece W in the reverse direction, synchronizing the movement speed of the cutter 11 to the rotating speed of the workpiece W so as to form an involute curve of the gear. In this way, each blade part 20 is sequentially brought into contact with the peripheral surface of the workpiece W, so that the workpiece W can be continuously cut on the side of the other face of each cutting blade 21 (the face 42 of the cutting blade 21 facing in direction B of movement of the cutter 11 in FIGS. 7 and 8).

By continuously repeating the operation for rotating the workpiece W in the forward direction while moving the cutter 11 in direction A (FIGS. 5 and 6) and the operation for rotating the workpiece W in the reverse direction while moving the cutter 11 in direction B (FIGS. 7 and 8) with the cutter 11 rotating in one direction, the gear 31 can be generated efficiently on the workpiece W.

As has been described above, the controller 14 controls the reciprocation of the cutter 11 by the cutter driver 12 and the forward or reverse rotation by the workpiece holder 13 in such a manner that the direction and speed of reciprocation along the axis R1 of the cutter 11 and the direction and speed of rotation around the rotational axis R2 of the workpiece W are synchronized with each other at the face where the cutter 11 contacts the workpiece W.

The cutter driver 12 being composed of a cutter holder of a lathe and the workpiece holder 13 being composed of a spindle of a lathe, the above-described gear machining apparatus 1 can be achieved by using a general lathe, for example, an automatic lathe. More specifically, an operating program of a lathe has only to be made which mounts the cutter 11 rotatably on the cutter holder of the lathe, holds the workpiece W by a chuck of the spindle, rotates the cutter 11 in one direction around the axis R1 and reciprocate the cutter 11 within a prescribed distance along the axis R1, and rotates the spindle in the forward or reverse direction around the axis R2 in synchronism with the reciprocation of the cutter 11 as described above. By operating the lathe in accordance with this operating program, the workpiece W is rotated in the forward or reverse direction around the axis R2 in synchronism with the reciprocation of the cutter 11, and the gear 31 can be easily generated on the workpiece W. Therefore, there is no need to provide a mechanism for tilting the cutter (hob), as would be the case if a hob were used as the cutter to generate a gear, but by just mounting the cutter 11 so as to cross at right angles with respect to the axis of the spindle, the gear can be easily generated using a general lathe.

Figure 9:
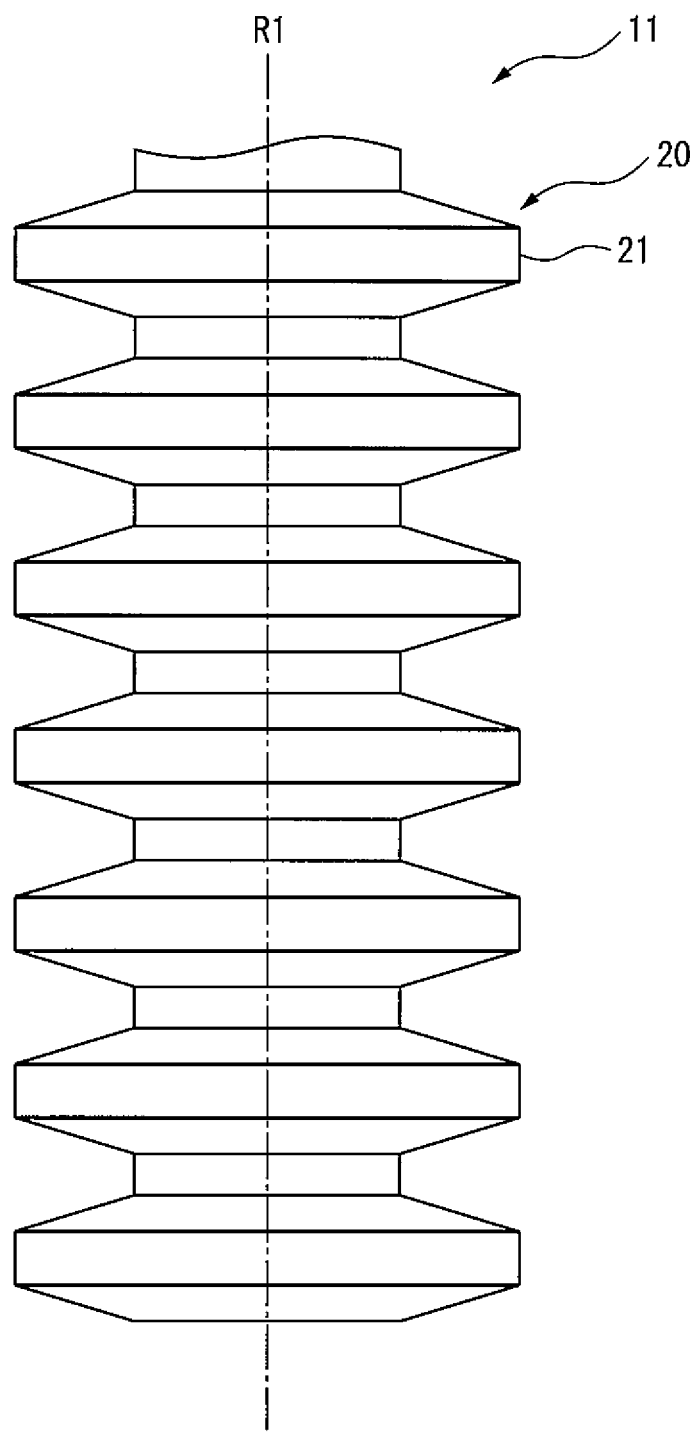
FIG. 9 is a diagram showing a modified example of the blade part of the cutter in the gear machining apparatus according to the embodiment of the present invention.

FIG. 9 is a diagram showing a modified example of the blade part of the cutter in the gear machining apparatus according to the embodiment of the present invention. As shown in FIG. 9, the blade part 20 may be composed of a one-piece cutting blade which continuously goes around the axis R1 of the cutter 11 in the form of a ring.

In the above embodiment, a spur gear has been generated on the peripheral surface of the workpiece W by setting the axis R1 of the cutter 11 at right angles to the axis R2 of the workpiece W. As a modified example, if either or both of the tilt angle of the axis of the cutter 11 driven by the cutter driver 12 and the tilt angle of the rotational axis of the workpiece W held by the workpiece holder 13 are set so that the axis R1 of the cutter 11 and the axis R2 of the workpiece W cross each other at a prescribed angle other than right angles, it is also possible to generate a helical gear.

In the example shown in FIGS. 5 to 8, the workpiece W is cut into the gear whose external shape is defined by an involute tooth profile by reciprocating the cutter 11 in directions A and B while rotating the cutter 11 in one direction with the speed of the cutter 11 synchronized to the rotational speed of the workpiece W, and by rotating the workpiece W in the forward and reverse directions in synchronism with the reciprocation of the cutter 11 so as to generate an involute tooth profile. However, apart from the process of a gear having an involute tooth profile, with the gear machining apparatus according to the above-mentioned embodiment, the workpiece W may be cut into a gear having a cycloid tooth profile, or a gear having a rectangular or triangular tooth profile by synchronizing the cutter 11 and the workpiece W so as to generate a cycloid, rectangular, or triangular tooth profile, etc.

Further, using the gear machining apparatus according to the above-mentioned embodiment, an external shape of shaft having a gear-shaped cross-section, for example, a splined shaft or a serrated shaft, may be formed in the workpiece W. In that case, for example, while rotating the workpiece W, the workpiece holder 13 should be moved in direction C by the length of the splined shaft to be formed on the workpiece W.

Examples of the splined shaft or serrated shaft to be formed here may include an involute shaft or serrated shaft whose external shape of the cross-section is an involute profile or an involute tooth profile defining a rectangular, triangular, or similar tooth shape, or whose teeth are rectangular, triangular, etc. in shape. Further, a gear or a shaft having a gear-shaped cross-section (a splined shaft or a serrated shaft) may be formed so that the teeth are formed on a portion of the outer circumference thereof.

The present invention can be applied to generating a gear or a shaft having a gear-shaped cross-section by using a lathe.

DESCRIPTION OF THE REFERENCE NUMERALS

1 . . . GEAR MACHINING APPARATUS
11 . . . CUTTER
12 . . . CUTTER DRIVER
13 . . . WORKPIECE HOLDER
14 . . . CONTROLLER
20 . . . BLADE PART
21 . . . CUTTING BLADE
31 . . . GEAR TOOTH

The invention claimed is:

1. A machining apparatus comprising:
a cutter which includes a plurality of blade parts that are disposed side by side along an axis, each of the blade parts being formed in the shape of a respective ring around a peripheral surface of the cutter, wherein the cutter is driven to rotate about the axis;
a workpiece holder which holds a workpiece rotatably;
a cutter driver which moves the cutter relative to the workpiece along an axial direction of the cutter along the axis; and
a controller, wherein
an external shape of a gear or a shaft having a gear-shaped cross-section is formed on the peripheral surface of the workpiece by synchronizing the rotation of the workpiece with the relative movement of the cutter and the workpiece and by pressing the cutter onto the workpiece while rotating the cutter,
the controller is configured to cause the cutter driver to drive the cutter to rotate in one direction around the axis and to reciprocate relative to the workpiece in two opposite directions along the axis, and
the controller is configured to cause the workpiece holder to rotate the workpiece in accordance with the reciprocation of the cutter such that the controller is configured to cause the workpiece holder to rotate in a forward direction when the cutter is moving in one of the directions along the axis, and is configured to cause the workpiece holder to rotate the workpiece in a reverse direction when the cutter is moving in the other direction along the axis, such that cutting is performed on the workpiece so as to form thereon the external shape of a gear or the shaft having a gear-shaped cross-section by placing each of the blade parts of the cutter in contact with the peripheral surface of the workpiece.

2. The machining apparatus according to claim 1, wherein the cutting forms the shaft having a gear-shaped cross-section, wherein the shaft is composed of a splined shaft or a serrated shaft.

3. The machining apparatus according to claim 1, wherein the controller controls the reciprocation of the cutter by the cutter driver and the forward and reverse rotation by the workpiece holder in such a manner that a direction and speed of reciprocation of the cutter and a direction and speed of rotation of the workpiece are synchronized with each other at.

4. The machining apparatus according to claim 1, wherein each of the blade parts is composed of a plurality of cutting blades disposed at prescribed spaced intervals around the peripheral surface of the cutter.

5. The machining apparatus according to claim 1, wherein each of the blade parts is composed of a cutting blade formed continuously so as to go around the axis.

6. A machining method comprising steps of:
   rotating a cutter in one direction around an axis, the cutter having a plurality of blade parts disposed side by side along the axis, each blade part being formed in the shape of a respective ring around a peripheral surface of the cutter, as well as reciprocating the cutter relative to a workpiece in two opposite directions along the axis;
   rotating the workpiece in a forward direction when the cutter is moving in one of the directions along the axis, and rotating the workpiece in a reverse direction when the cutter is moving in the other direction along the axis, in accordance with reciprocation of the cutter; and
   cutting the workpiece so as to form thereon an external shape of a gear or a shaft having a gear-shaped cross-section by placing each of the blade parts of the cutter in contact with the peripheral surface of the workpiece.

7. The machining method according to claim 6, wherein the cutting forms the shaft having a gear-shaped cross-section, wherein the shaft is composed of a splined shaft or a serrated shaft.

8. The machining method according to claim 6, wherein the steps of rotating the workpiece in the forward and reverse directions in accordance with reciprocation of the cutter include the step of synchronizing a direction and speed of reciprocation of the cutter and a direction and speed of rotation of the workpiece.

9. The machining method according to claim 6, wherein the each of blade parts is composed of a plurality of cutting blades disposed at prescribed spaced intervals around the peripheral surface of the cutter.

10. The machining apparatus according to claim 6, wherein each of the blade parts is composed of a cutting blade formed continuously so as to go around the axis.

* * * * *

UNITED STATES PATENT AND TRADEMARK OFFICE
CERTIFICATE OF CORRECTION

PATENT NO. : 9,902,003 B2
APPLICATION NO. : 15/116125
DATED : February 27, 2018
INVENTOR(S) : Hikaru Takahashi Page 1 of 1

It is certified that error appears in the above-identified patent and that said Letters Patent is hereby corrected as shown below:

In the Claims

Column 8, Line 19, replace "apparatus" with --method--.

Signed and Sealed this
Tenth Day of July, 2018

Andrei Iancu
*Director of the United States Patent and Trademark Office*